United States Patent
Futa et al.

(10) Patent No.: US 8,418,256 B2
(45) Date of Patent: Apr. 9, 2013

(54) MEMORY CONTROL APPARATUS, CONTENT PLAYBACK APPARATUS, CONTROL METHOD AND RECORDING MEDIUM

(75) Inventors: Yuichi Futa, Osaka (JP); Tomoyuki Haga, Nara (JP); Takayuki Ito, Osaka (JP); Hideki Matsushima, Osaka (JP); Yoshikatsu Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 12/484,627

(22) Filed: Jun. 15, 2009

(65) Prior Publication Data
US 2009/0313425 A1   Dec. 17, 2009

(30) Foreign Application Priority Data
Jun. 17, 2008   (JP) ................. 2008-157930

(51) Int. Cl.
*G06F 12/00* (2006.01)
*G06F 13/00* (2006.01)
*G06F 13/28* (2006.01)
*G06F 7/04* (2006.01)
*G06F 17/30* (2006.01)
*H04N 7/16* (2011.01)

(52) U.S. Cl. ......................................... 726/26; 711/163

(58) Field of Classification Search ................. None
See application file for complete search history.

(56) References Cited

U.S. PATENT DOCUMENTS
2003/0076957 A1 * 4/2003 Asokan et al. ................ 380/270

FOREIGN PATENT DOCUMENTS
JP   8-314807   11/1996
JP   11-85629    3/1999

OTHER PUBLICATIONS
Chisvin et al., Content-Addressable and Associative Memory: Alternatives to the Ubiquitous RAM, Jul. 1989, IEEE, 14 pages.*

* cited by examiner

*Primary Examiner* — Christian P Chace
*Assistant Examiner* — Gary W Cygiel
(74) *Attorney, Agent, or Firm* — Wenderoth, Lind & Ponack, L.L.P.

(57) ABSTRACT

A data storage apparatus is provided that realizes a measure against deterioration of a flash memory in which integrity check data is stored. A content playback apparatus (1000) uses a hash value of playback history information as integrity check data (confirmation data) for confirming whether the playback history information has been falsified. A first address calculation unit (1004) and a second address calculation unit (1006) determine a read-in address and a storage destination address for the integrity check data, with use of the hash value. Accordingly, the storage destination addresses can be diffused, thus enabling preventing deterioration of the flash memory.

7 Claims, 13 Drawing Sheets

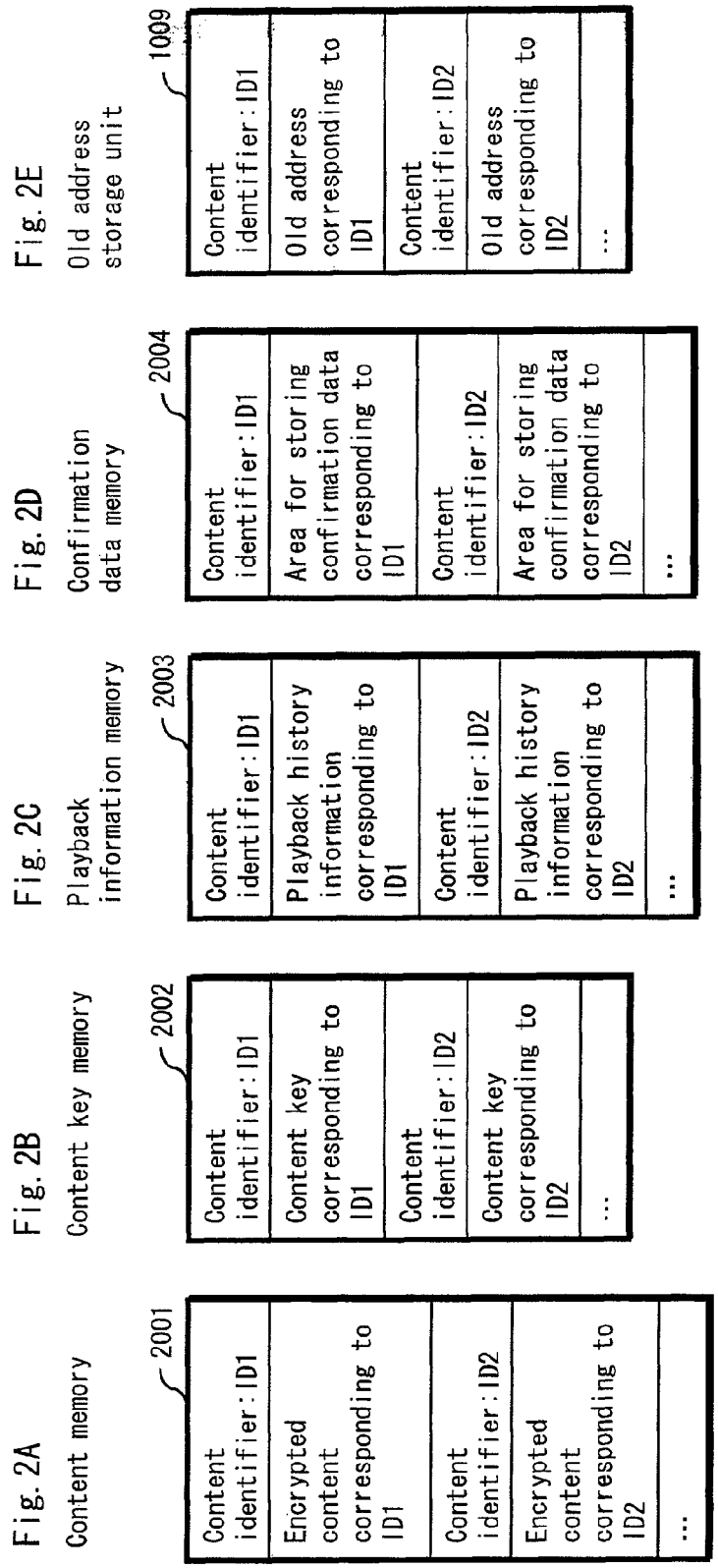

Fig. 3A

| Content identifier | Playback history information [=playback time] |
|---|---|
| ID1 | 0:1:25 |
| ID2 | 2:30:40 |

Fig. 3B

| Content identifier | Playback history information [=number of times played back] |
|---|---|
| ID1 | 1 |
| ID2 | 3 |

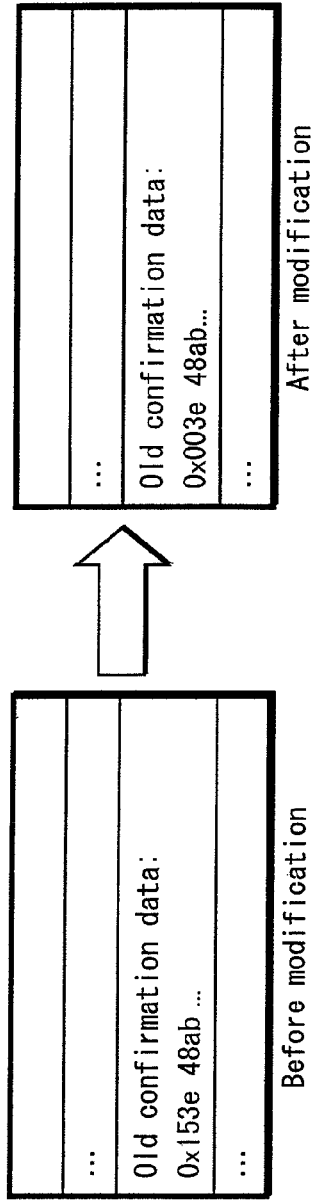

Fig. 9A

Modification example (1) showing modification in area of confirmation data memory 2004 that stores confirmation data for ID1

Before modification → Write 0x00 in upper byte → After modification

Old confirmation data: 0x153e 48ab...

Old confirmation data: 0x003e 48ab...

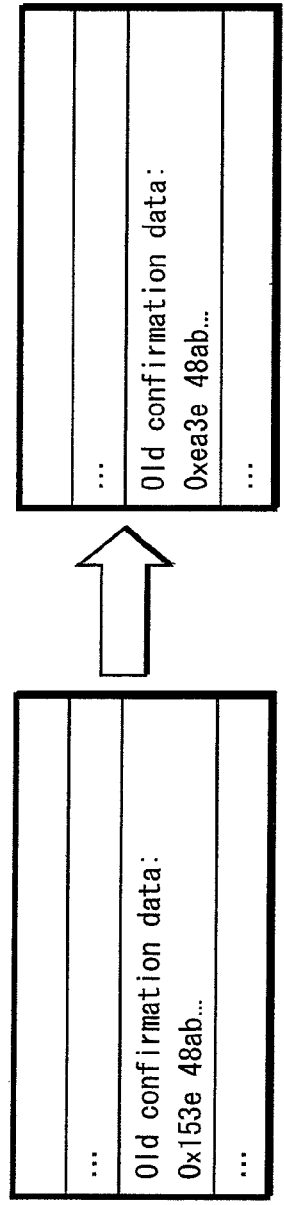

Fig. 9B

Modification example (2) showing modification in area of confirmation data memory 2004 that stores confirmation data for ID1

Before modification → Perform XOR operation on 0xff in upper byte → After modification Old confirmation data: 0x153e 48ab...

Old confirmation data: 0xea3e 48ab...

MEMORY CONTROL APPARATUS, CONTENT PLAYBACK APPARATUS, CONTROL METHOD AND RECORDING MEDIUM

This application is based on Application No. 2008-157930 filed in Japan, the content of which is hereby incorporated by reference.

BACKGROUND OF INVENTION

1. Field of the Invention

The present invention relates to a measure against deterioration of a flash memory, and in particular to a measure against deterioration of a flash memory for storing integrity check data used in preventing unauthorized use of content.

2. Description of the Related Art

In recent years, content distribution systems, in which content is transmitted from a server to a client and the client plays back the content, have come into use.

There are various ways to sell content for the systems, including performing control so that the content can be viewed only once, setting a limit on a number of times viewed, setting a limit on accumulated viewing time, billing according to viewing time, etc. (see non-patent document 1). When billing is performed according to the number of times the content is viewed, or the accumulated viewing time of the content etc., it is necessary for the client to manage information pertaining to the number of times the content is viewed, or the accumulated viewing time, etc. (hereinafter referred to as "playback information").

In this case, there is a risk of a malicious user or an external attacker gaining unauthorized use of the content, in excess of the range of allowed use, by falsifying the playback information, or performing a save-restore attack by saving a prior state of the playback information and restoring the playback information of the previous state after the content has been viewed.

In view of this, conventionally, unauthorized use of the content is prevented by storing integrity check data pieces such as hash values, etc. for the playback information in a secure memory, and checking whether the playback information has been falsified. A flash memory, which is a non-volatile memory, is likely to be used as the secure memory for storing the integrity check data pieces. However, since the flash memory deteriorates as a result of rewriting, in the end, the flash memory will break down.

In particular, there are many cases in which the integrity check data pieces are frequently updated at intervals from every several seconds to every several minutes, and when using a flash memory as the memory for storing the integrity check data pieces, the extent of the deterioration of the flash memory increases in proportion to the frequency of rewriting.

Patent document 1 and patent document 2 disclose measures against the deterioration of the flash memory.

Patent document 1 discloses technology for performing control so that a number of times of writing data to a storage area of a flash memory is equal to or less than a number of times at which the flash memory can withstand deterioration. Specifically, as shown in FIG. 13(a), data and a number of times the data has been written are stored as a pair in the storage area, and a pointer indicating the storage area currently in use is stored in a first area of the flash memory. When the number of times the data has been written exceeds a predetermined threshold, as shown in FIG. 13(b), the pointer is updated so that a next storage area is used. As a result, control can be performed so that the number of times written to each of the storage areas is less than or equal to the threshold.

Also, patent document 2 discloses technology for determining a storage area to be used next based on use frequencies of the storage areas in the flash memory. According to this technology, it is possible to suppress the deterioration of the flash memory by averaging the use frequencies of the storage areas.

However, in patent document 1, the amount of throughput is increased, since to perform read processing of integrity check data stored in the flash memory, it is necessary to read both the pointer and the data, and reading the pointer and writing the data and the number of times the data has been written are necessary to perform writing processing. Furthermore, a flash memory normally performs writing with use of a block unit as a minimum writing unit, but in a case that the data and the number of times are written to separate blocks, deterioration due to writing both the data and the number of times increases proportionally. Also, in patent document 2, it is necessary to manage the use frequencies of the areas.

In this way, the measures against deterioration described in patent document 1 and patent document 2 have the problem that the amount of throughput of reading and writing data is increased.

Patent document 1: Japanese Patent Application Publication No. H08-314807

Patent document 2: Japanese Patent Application Publication No. H11-85629

Non-patent document 1: Marlin Use Cases Part 1, 2, Mar. 24, 2008

Non-patent document 2: "Gendai Angou" (Modern Cryptography) by Tatsuaki Okamoto and Hirosuke Yamamoto, Sangyou Tosho (1997)

SUMMARY OF INVENTION

The present invention was achieved in view of the above problem, and a first aim of the present invention is to provide a data storage apparatus, content playback apparatus, data storage method, computer program, recording medium, and integrated circuit that reduce an amount of throughput when reading and writing over the above-mentioned conventional technology, and realizes a measure against deterioration adapted for a secure flash memory that stores integrity check data.

In order to achieve the aim described above, the present invention is a memory control apparatus including a non-secure storage unit that is not protected by tamper resistant technology and stores a predetermined information piece; a secure storage unit that is protected by tamper resistant technology and has a property of deteriorating when data is repeatedly written thereon; a generation unit operable to generate an integrity check data piece, that is data for verifying the predetermined information piece, by performing a predetermined calculation on the predetermined information piece stored in the non-secure storage unit; and a storage processing unit operable to generate, according to a number sequence in a predetermined portion of the integrity check data piece, a storage destination address at which to store the integrity check data piece in the secure storage unit, and to store the integrity check data piece at the generated storage destination address in the secure storage unit.

According to this structure, since a different integrity check data piece is generated upon each update of the predetermined information, by generating a storage destination address in the secure storage unit according to a portion of an integrity check data piece generated by performing a predetermined calculation on a predetermined information piece stored in a non-secure storage unit, the writing in the predetermined area of the secure storage unit is focused, and deterioration of the secure storage unit can be suppressed.

Also, since the storage destination address in the secure storage unit is generated based on a portion of the integrity check data piece generated from the predetermined information, and the generated integrity check data piece is stored at the storage destination address according to the generated storage destination address, processing to separately generate an address for storing the integrity check data can be reduced, and the processing can be made commensurately faster.

Also, the present invention is a content playback apparatus including a playback unit operable to play back content; a non-secure storage unit that is not protected by tamper resistant technology and stores a playback information piece related to playback of the content; a secure storage unit that is protected by tamper resistant technology and has a property of deteriorating when data is repeatedly written thereon; a generation unit operable to generate an integrity check data piece, that is data for verifying the playback information piece, by performing a predetermined calculation on the playback information piece stored in the non-secure storage unit; and a storage processing unit operable to generate, according to a number sequence in a predetermined portion of the integrity check data piece, a storage destination address at which to store the integrity check data piece in the secure storage unit, and to store the integrity check data piece at the generated storage destination address in the secure storage unit.

According to this structure, since a different integrity check data piece is generated upon each update of the playback information, by generating a storage destination address in the secure storage unit according to a portion of an integrity check data piece generated by performing a predetermined calculation on a playback information piece of the content stored in a non-secure storage unit, the writing in the predetermined area of the secure storage unit is focused, and deterioration of the secure storage unit can be suppressed.

Also, since the storage destination address in the secure storage unit is generated based on a portion of the integrity check data piece generated from the playback information, and the generated integrity check data piece is stored at the storage destination address according to the generated storage destination address, processing to separately generate an address for storing the integrity check data can be reduced, and the processing can be made commensurately faster.

Also, the present invention is a content playback apparatus including a playback unit operable to play back content; a non-secure storage unit that is not protected by tamper resistant technology and stores a playback information piece related to playback of the content; a secure storage unit that is protected by tamper resistant technology and has a property of deteriorating when data is repeatedly written thereon; a generation unit operable to generate a first integrity check data piece, that is data for verifying the playback information piece, by performing a predetermined calculation on the playback information piece stored in the non-secure storage unit; a storage processing unit operable to generate, according to a first number sequence in a predetermined portion of the first integrity check data piece, a first address at which to store the first integrity check data piece in the secure storage unit, and to store the first integrity check data piece at the generated first address in the secure storage unit; and a verification unit operable to (i) calculate a second integrity check data piece by reading a playback information piece pertaining to content targeted for playback from the non-secure storage unit and performing the predetermined calculation on the read playback information piece, (ii) read an integrity check data piece from a second address in the secure storage unit, the second address having been generated according to a second number sequence in a predetermined portion of the second integrity check data piece, (iii) compare the read integrity check data piece to the first integrity check data piece, (iv) judge, if a result of the comparison is a match, that the playback information piece has not been falsified, and (v) judge, if the result of the comparison is not a match, that the playback information piece has been falsified.

According to this structure, a playback information piece related to content targeted for playback is read from the non-secure storage unit, the predetermined calculation is performed on the read playback information piece, a second integrity check data piece is calculated, the integrity check data piece is read from the generated second address in the secure storage unit, according to a second number sequence included in the predetermined area of the second integrity check data piece, the read integrity check data is compared to the first integrity check data, and if there is a match, a judgment is made that the playback information piece has not been falsified.

According to this structure, by comparing the playback information piece stored in the non-secure storage unit that can be accessed from outside the playback apparatus to the integrity check data piece stored in the secure storage unit that cannot be accessed from outside the playback apparatus, verification is performed as to whether the playback information piece has been falsified. Therefore, the judgment of whether the playback information has been falsified can be reliably verified.

Here, if the verification unit judges that the playback information piece has been falsified, the playback unit may prohibit playback of the content.

According to this structure, unauthorized use of the content can be prevented.

Here, if the verification unit judges that the playback information piece has not been falsified, the playback unit may play back the content.

According to this structure, if the playback information has not been falsified, playback of the content is permitted.

Here, the content playback apparatus may further include a playback information generation unit operable to update the playback information piece when the content is played back by the playback unit, thereby generating an updated playback information piece, and to store the updated playback information piece in the non-secure storage unit, wherein the playback unit may play back the content if the verification unit judges that the playback information piece has not been falsified, the playback information generation unit may store the updated playback information piece in the non-secure storage unit, the generation unit may generate a third integrity check data piece by performing the predetermined calculation on the updated playback information piece, the storage processing unit may rewrite a portion of the first integrity check data piece stored at the first address of the secure storage unit, thereby generating a partially rewritten first integrity check data piece, and the storage processing unit may further generate, according to a third number sequence in the predetermined portion of the third integrity check data piece, a third address at which to store the third integrity check data piece in the secure storage unit, and store the third integrity check data piece at the generated third address in the secure storage unit.

When the playback unit plays back the content, it is also necessary to update the playback information of the content.

In this case, an integrity check data piece is generated according to the playback information after the playback, and is stored in the secure storage unit. Meanwhile, the integrity check data piece corresponding to the playback information before playback is also stored in the secure storage unit. Here, since the non-secure storage unit can be accessed from outside the present apparatus, there is a risk of the stored playback information being falsified to reflect the information before the update.

As described above, since integrity check data corresponding to the playback information before playback is also stored in the secure playback unit, if integrity check data is generated from falsified playback information from before the update, there is a risk of unauthorized use of the content, since there is a match between the integrity check data piece based on the playback information before the update, and an integrity check data piece stored in the secure storage unit.

In view of this, according to the present structure, a portion of the first integrity check data piece stored in the first address of the secure storage unit is rewritten.

According to this structure, even if playback information stored in the non-secure storage unit is falsified to be the pre-update playback information, since the integrity check data piece generated based on the pre-update playback information does not match the integrity check data piece corresponding to the pre-update playback information that is stored in the secure storage unit, the judgment of whether the playback information has been falsified can be reliably verified, and unauthorized use of the content can be prevented.

Here, in the content playback apparatus, the verification unit, if the read integrity check data piece is the partially rewritten first integrity check data piece, may compare the predetermined integrity check data piece to the first integrity check data piece and judge that there is not a match.

According to this structure, since the first integrity check data piece is compared to the partially rewritten first integrity check data piece, the results of the comparison is that the two do not match, and unauthorized use of the content can be prevented.

Here, the content playback apparatus may further include an old address storage unit that stores a first address of the partially rewritten first integrity check data piece, wherein the verification unit may read, according to the first address read from the old address storage unit, the partially rewritten first integrity check data piece from the secure storage unit, as the integrity check data piece, and the verification unit may compare the partially rewritten first integrity check data piece to the first integrity check data piece and judge that there is not a match.

According to this structure, by providing an old address storage unit that holds a first address of a first partially rewritten integrity check data piece, since apart from the third address of the third integrity check data piece corresponding to the pre-update playback information, a storage destination of the first partially rewritten integrity check data piece corresponding to the pre-update playback information is stored, comparison between the first partially rewritten integrity check data piece and the first integrity check data piece is facilitated.

Here, the secure storage unit may be a flash memory in which data is written so that a block of a predetermined size is treated as a minimum unit for writing.

According to this structure, the writing to the predetermined area of the flash memory is focused, and deterioration of the flash memory can be prevented.

Here, the number sequence in the predetermined portion of the integrity check data piece may be a number sequence indicating a lower predetermined bit of the integrity check data piece.

According to this structure, a storage destination address can be generated according to a number sequence indicating a lower predetermined bit of the integrity check data piece.

Here, the predetermined calculation may be a hash value calculation, and the integrity check data piece may be a hash value.

According to this structure, using a hash value enables improving the reliability of falsification detection. Also, according to this structure, since the storage destination address is generated according to a hash value, storage destinations for data in the secure storage units can be diffused.

Here, the playback information piece may be playback history information indicating a history of playing back the content.

According to this structure, detecting falsification of playback right can be performed, and unauthorized use of the content can be prevented.

Here, the playback information piece maybe information indicating a playback right of the content.

According to this structure, detecting falsification of playback right can be performed, and unauthorized use of the content can be prevented.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIGS. 2A, 2B, 2C, 2D, and 2E show data stored in memories in the content playback apparatus 1000;

FIGS. 3A and 3B show examples of playback history information;

FIGS. 9A and 9B show specific examples of modification processing of confirmation data performed by a confirmation data conversion unit 1010;

DESCRIPTION OF THE PREFERRED EMBODIMENT

The following describes a content playback apparatus 1000 that is an embodiment of the present invention with reference to the drawings.

Structure of the Content Playback Apparatus 1000

Figure 1:
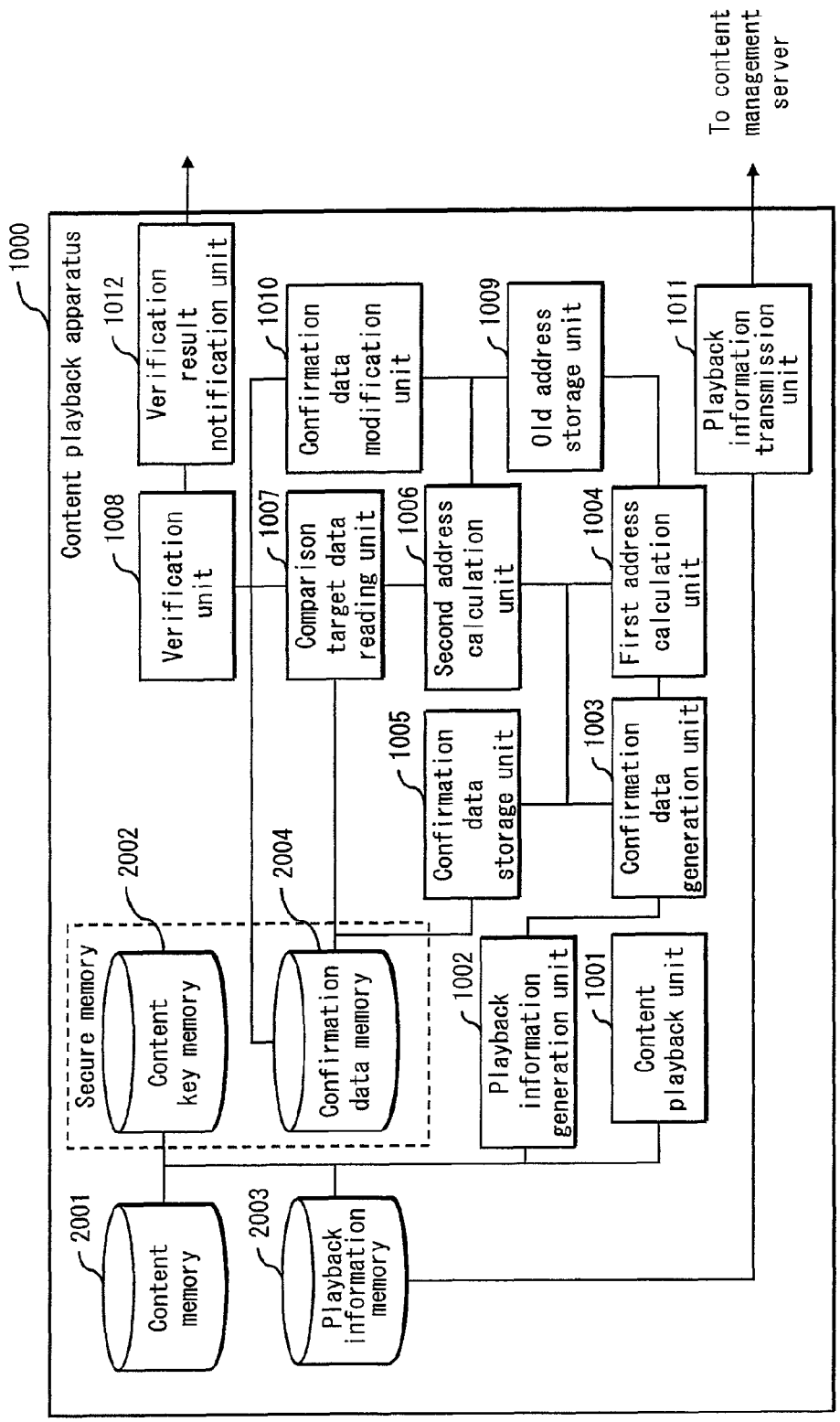
FIG. 1 is a block diagram showing a structure of a content playback apparatus 1000 as one embodiment of the present invention.

FIG. 1 is a functional block diagram showing a structure of the content playback apparatus 1000.

As shown in FIG. 1, the content playback apparatus 1000 includes a content memory 2001, a content key memory 2002, a playback information memory 2003, a confirmation data memory 2004, a content playback unit 1001, a playback information generation unit 1002, a confirmation data generation unit 1003, a first address calculation unit 1004, a confirmation data storage unit 1005, a second address calculation unit 1006, a comparison target data reading unit 1007, a verification unit 1008, an old address storage unit 1009, a confirmation data modification unit 1010, a playback information transmission unit 1011, and a verification result notification unit 1012.

The content playback apparatus 1000 is a computer system specifically including a microprocessor, a ROM, a RAM, a hard disk unit, etc.

A computer program is recorded on the ROM or the hard disk unit, and the content playback apparatus 1000 achieves its functions as the microprocessor operates in accordance with the computer program.

(1) Content Memory 2001

The content memory 2001 is a memory for storing an encrypted content. The content memory 2001 is, for example, realized by a non-volatile memory such as a flash memory or a hard disk. Also, the content memory 2001 is not limited to being a flash memory or a hard disk, and may instead be a memory card to be inserted in the content playback apparatus 1000.

The encrypted content is an encrypted text generated by encrypting a content with use of a content key. Note that the content key is stored in the content key memory 2002.

The content may be one or more of music, a movie, a photograph, animation, a computer game, a computer program, etc., and a content identifier ID is added to a content data piece CD which is the data of the content.

An encrypted content data piece CCD is generated as follows.

$$CCD = Enc(KC, ID\|CD)$$

Here, "KC" indicates the content key, "∥" indicates concatenation of the data, and "Enc (K, D)" indicates an encrypted text obtained by encrypting a data piece D with use of an encryption key K.

Common key encryption (block encryption or stream encryption) is used as the encryption method for encrypting the content. Note that public key encryption may also be used as the encryption method. In this case, the encrypted content data piece CCD is generated as follows.

$$CCD = Enc(KPC, ID\|CD)$$

Here, "KPC" indicates a public key.

Note that since such encryption methods are described in detail from page 79 to page 105 (common key encryption) and from page 107 to page 130 (public key encryption) of non-patent document 2, such description is omitted here.

Also, encrypted content is considered here to be the content data piece CD which includes a content identifier ID and has been encrypted, but the encrypted content is not limited to this. The encrypted content may be content that was encrypted without including a content identifier ID, or was encrypted including other data (for example, right information pertaining to the content).

FIG. 2A shows an example of information stored in the content memory 2001. As shown in FIG. 2A, the content memory 2001 stores encrypted contents in correspondence with content identifiers.

In the specific example shown in FIG. 2A, the content memory 2001 stores a plurality of content identifier and encrypted content pairs, including a pair composed of a content identifier "ID1" and an encrypted content identified by the content identifier "ID1", and a pair composed of a content identifier "ID2" and an encrypted content identified by the content identifier "ID2". However, the content memory 2001 may instead simply store only one encrypted content.

(2) Content Key Memory 2002

The content key memory 2002 is a memory for storing the content key. Content keys are keys for encrypting contents.

The content key memory 2002 is realized by a non-volatile memory such as a flash memory or a hard disk, etc. Also, the content key memory 2002 is not limited to being a flash memory or a hard disk, and may instead be a memory card to be inserted in the content playback apparatus 1000.

Since there is a risk of unauthorized decryption of the encrypted content if the content key is leaked, a secure implementation of the content key memory 2002 is preferable from a safety standpoint.

The encryption method in which the content key is used is common key encryption, described in the description of the content memory 2001, but public key encryption may also be used.

When common key encryption is used, a same key as the encryption key used for the encryption is stored as the content key in the content key memory 2002.

When public key encryption is used, a private key corresponding to the public key used in the encryption is stored as the content key in the content key memory 2002.

As shown in FIG. 2B, the content key memory 2002 stores, in correspondence with the content identifiers, content keys corresponding to the encrypted contents stored in the content memory 2001 (see FIG. 2A).

(3) Playback Information Memory 2003

The playback information memory 2003 is a memory for storing playback history information indicating a history of content playback.

The playback information memory 2003 is realized by a non-volatile memory such as a flash memory or a hard disk, for example. Also, the playback information memory 2003 is not limited to being a flash memory or a hard disk, and may instead be a memory card to be inserted in the content playback apparatus 1000.

FIG. 2C shows an example of information stored in the playback information memory 2003. As shown in FIG. 2C, for each content, the playback information memory 2003 stores playback history information of the content in correspondence with a content identifier.

Note that a start address of a storage destination has been provided in advance for each content.

FIGS. 3A and 3B show examples of playback history information. FIG. 3A shows an example of using playback time as the playback history information, and FIG. 3B shows an example of using a number of times played back as the playback history information.

(4) Confirmation Data Memory 2004

The confirmation data memory 2004 is a memory for storing a confirmation data piece that is a hash value of a playback history information piece.

The confirmation data memory 2004 is realized by a nonvolatile memory such as a flash memory, for example. Also, the confirmation data memory 2004 is not limited to being a flash memory, and may instead be a hard disk or a memory card to be inserted in the content playback apparatus 1000.

If the confirmation data piece is falsified, the falsification of the playback history information cannot be correctly checked, and there is a risk of unauthorized use of the content. Therefore, a secure implementation of the confirmation data memory 2004 is preferable from a safety standpoint.

FIG. 2D shows exemplary information stored in the confirmation data memory 2004. As shown in FIG. 2D, for each content, an area for storing a confirmation data piece for the content has been provided in advance in the confirmation data memory 2004.

For example, a content identifier "ID1" has been allotted to the area 2004a, and the area 2004a is an area for storing a confirmation data piece of a content identified by "ID1". Similarly, a content identifier "ID2" has been allotted to the area 2004b, and the area 2004b is an area for storing a confirmation data piece of a content identified by "ID2".

A size greater than or equal to a sufficient size for storing a plurality of pieces of confirmation data is made available in each area. As an example, when the size of a confirmation data piece is 256 bits (32 bytes), the size of each area is $2^8 \times 32 = 8,192$ bytes. Here, x^y indicates x to the power of y.

Note that for each content, a start address of an area in which a confirmation data piece for the content can be stored is provided in advance.

(5) Content Playback Unit 1001

The content playback unit 1001 reads encrypted content stored in the content memory 2001 and a content key stored in the content key memory 2002, and decrypts content with use of the content key, thus obtaining decrypted content. Furthermore, the content playback unit 1001 plays back the decrypted content.

Note that to play back a content, the content playback unit 1001 receives a content identifier indicating the content to be played back that is specified from an external device, reads the encrypted content and the content key corresponding to the specified content identifier, and performs decryption processing and playback processing.

Here, the content playback unit 1001 pre-stores a table in which content identifiers are stored in correspondence with start addresses of storage destinations of encrypted contents and starting addresses of storage destinations of content keys. Reading the encrypted content and the content key corresponding to the specified content identifier may be performed based on this table.

(6) Playback Information Generation Unit 1002

When content is played back by the content playback unit 1001, the playback information generation unit 1002 generates playback history information, and stores the generated playback history information in the playback information memory 2003.

As specific examples of playback history information, a playback time, indicating an accumulated length of time in which the content is played back, may be used as shown in FIG. 3A, or a number of times played back, indicating an accumulated number of times that the content has been played back, may be used as shown in FIG. 3B.

In the example shown in FIG. 3A, the playback information generation unit 1002 generates, for each content identifier, playback history information that is a playback time for the content. In the example shown in FIG. 3B, for each content identifier, content history information that is a number of times the content has been played back is generated. Note that the playback time and the number of times the content has been played back are examples of playback history information, and the playback history information is not limited to these.

If the playback history information is a playback time, the playback information generation unit 1002 generates playback history information for each fixed time period (for example, one minute), and if the playback history information is a number of times played back, the playback information generation unit 1002 generates playback history information indicating an updated number of times played back, at a playback start time or a playback end time. Also, the playback information generation unit 1002 may update the number of times played back at a predetermined time in the playback, instead of updating the number of times played back at the playback start time or the playback end time.

If a playback time is used as the playback history information, the playback information generation unit 1002 includes a means for measuring the playback time. Also, when a number of times played back is used as the playback history information, the playback information generation unit 1002 includes a means for detecting the playback start time or the playback end time. The present invention does not have any particular limitation on methods used for detecting triggers for generating the playback history information.

The playback information generation unit 1002 stores the generated playback history information in the playback information memory 2003.

(7) Confirmation Data Generation Unit 1003

When the playback history information of the content being played back is updated, the confirmation data generation unit 1003 generates a confirmation data piece for the updated playback history information.

Also, before the content is played back, the confirmation data generation unit 1003 generates a confirmation data piece for verifying the playback history information, based on the playback history information stored in the playback information memory 2003.

Specifically, the confirmation data piece is an output obtained by inputting hash target data (HD) to a hash function, that is to say a hash value.

In the example of FIG. 3A, the hash target data (HD) input to the hash function is a piece of data obtained by concatenating a content identifier and a corresponding playback time, and in the example of FIG. 3B, the data that is input is a piece of data obtained by concatenating a content identifier and a number of times played back. Note that the hash target data (HD) maybe a plurality of pairs each composed of a content identifier and a playback time, or may be a plurality of pairs each composed of a content identifier and a number of times played back.

The hash function used by the confirmation data generation unit 1003 may be SHA-1, SHA-2 (SHA-256, etc.), RIPEMD, MD5, etc.

Since a secure implementation of the hash function is necessary from a safety standpoint so as not to let the attacker know, the confirmation data generation unit 1003 can use a keyed hash function, for example.

Representing the key of the keyed hash function as KH and the hash target data as HD, the confirmation data piece (hash value) (H) is generated as follows.

$$H = \text{hash}(KH \| HD)$$

Here, "hash ( )" indicates the hash function, and "||" indicates concatenating the data.

In the present embodiment, the confirmation data generation unit 1003 uses SHA-256 as the keyed hash function. That is to say, the confirmation data piece (hash value) generated by the confirmation data generation unit 1003 consist of 256 bits.

Note that the confirmation data generation unit 1003 may use a keyed hash function using a common key encryption method such as MAC. Keyed hash functions are described in pages 189 to 185 of non-patent document 2.

In a case that the playback history information of the content being played back has been updated, and the confirmation data piece has been generated for the updated playback history information, the confirmation data generation unit 1003 outputs the generated confirmation data piece to the confirmation data storage unit 1005.

In a case that a confirmation data piece has been generated according to the playback history information stored in the playback information memory 2003, before the content is played back, to verify the playback history information, the confirmation data generation unit 1003 outputs the generated confirmation data piece to the second address calculation unit 1006.

(8) First Address Calculation Unit 1004

In a case that the playback history information of the content being played back has been updated, the first address calculation unit 1004 calculates a storage destination address for the confirmation data piece generated according to the updated playback history information.

The following describes an exemplary calculation method. Representing the confirmation data piece corresponding to the content identifier ID as H, and the start address of the area in which the confirmation data piece corresponding to the content identifier ID can be stored as S, the storage destination address AS1 is generated as follows.

$$AS1 = S + H \mod 2^8$$

Here, "x mod y" indicates a remainder when x is divided by y.

In the above example, since AS1 corresponds to the lower 8 bits of H, the first address calculation unit 1004 may simply set the lower 8 bits of the confirmation data piece (hash value) as the storage destination address, without performing the modulo calculation.

The first address calculation unit 1004 outputs the storage destination address to the confirmation data storage unit 1005.

(9) Confirmation Data Storage Unit 1005

The confirmation data storage unit 1005 receives the confirmation data piece from the confirmation data generation unit 1003, and receives a storage destination address from the first address calculation unit 1004.

The confirmation data storage unit 1005 stores the confirmation data piece in an area indicated by a storage destination address in the confirmation data memory 2004.

(10) Second Address Calculation Unit 1006

Upon receiving the confirmation data piece targeted for verification from the confirmation data generation unit 1003, the second address calculation unit 1006 calculates a read-in address of a comparison target data piece, which is necessary for the verification of the received confirmation data piece.

Specifically, the second address calculation unit 1006 calculates a read-in address for the comparison target data piece according to the confirmation data piece received from the confirmation data generation unit 1003. The calculation method is similar to the method of the first address calculation unit 1004. That is to say, representing the received confirmation data piece as H, and the start address at which the confirmation data piece can be stored as S, the read-in address AR2 is generated as follows.

$$AR2 = S + H \mod 2^8$$

Similarly to the first address calculation unit 1004, the second address calculation unit 1006 may simply set the lower 8 bits of the confirmation data piece (hash value) received from the confirmation data generation unit 1003 as the read-in address, without performing the modulo calculation.

The second address calculation unit 1004 outputs the confirmation data piece and the read-in address to the comparison target data reading unit 1007.

Also, upon receiving a verification success notification from the verification unit 1008, the second address calculation unit 1004 outputs the generated read-in address to the old address storage unit 1009.

(11) Comparison Target Data Reading Unit 1007

The comparison target data reading unit 1007 receives the confirmation data piece and the read-in address from the second address calculation unit 1004.

The comparison target data reading unit 1007 reads data stored in the area indicated by the read-in address from the confirmation data memory 2004, and sets the read data as the comparison target data piece.

The comparison target data reading unit 1007 outputs, to the verification unit 1008, the confirmation data piece received from the second address calculation unit 1004 and the comparison target data piece read from the confirmation data memory 2004.

(12) Verification Unit 1008

The verification unit 1008 receives the confirmation data piece and the comparison target data piece from the comparison target data reading unit 1007. The verification unit 1008 verifies whether the confirmation data piece matches the comparison target data piece.

If the confirmation data piece and the comparison target data piece match, this means that falsification of the playback history information or a save-restore attack etc. has not occurred. In this case, the content playback apparatus 1000 starts content playback processing. Also, if the confirmation data piece and the comparison target data piece match, the verification unit 1008 notifies the second address calculation unit 1006 to that effect.

If the confirmation data piece and the comparison target data piece do not match, this means that falsification of the playback history information or a save-restore attack etc. has occurred. In this case, the content playback apparatus 1000 stops the content playback processing.

The verification unit 1008 outputs the verification result to the verification result notification unit 1012.

(13) Old Address Storage Unit 1009

The old address storage unit 1009 stores a storage destination address of an old confirmation data piece. More specifically, when the verification unit 1008 judges that the comparison target data piece matches the confirmation data piece, the old address storage unit 1009 stores, as an old address, the read-in address calculated by the second address calculation unit 1006.

FIG. 2E shows an example of information stored in the old address storage unit 1009. As shown in FIG. 2E, the old address storage unit 1009, for each content, stores a content identifier in correspondence with an old address (a storage destination address of the old confirmation data piece).

(14) Confirmation Data Modification Unit 1010

The confirmation data modification unit 1010 modifies an old confirmation data piece stored in the confirmation data memory 2004.

More specifically, the confirmation data modification unit 1010 modifies a portion of the confirmation data piece stored in the area indicated by the old address stored in the old address storage unit 1009 of the confirmation data memory 2004. For example, the confirmation data modification unit 1010 may modify the last byte of the confirmation data piece, an arbitrary byte, or an arbitrary bit.

(15) Playback Information Transmission Unit 1011

The playback information transmission unit 1011 transmits playback history information stored in the playback information memory 2003 to a content management server that is not depicted.

The playback information transmission unit 1011 may transmit playback history information for each content indicated by a content identifier.

Also, the playback information transmission unit 1011 may include a function of generating a digital signature, and may add the digital signature to the playback history information and then transmit the playback history information to the content management server. Digital signatures are described in page 171 to 187 of non-patent document 2.

(16) Verification Result Notification Unit 1012

The verification result notification unit 1012 notifies the verification result received from the verification unit 1008 to an external device. Here, specific examples of external devices that receive the notification include a content management server, a manufacturing facility for the content playback apparatus 1000, etc.

Note that the verification result notification 1012 may be configured to notify the verification unit only in a case that the confirmation data piece does not match the comparison target data piece.

Operation of the Content Playback Apparatus 1000

Here, the operation of the content playback apparatus 1000 is described with use of the flowcharts of FIGS. 4 to 8.

(1) Overall Flow of Processing

Figure 4:
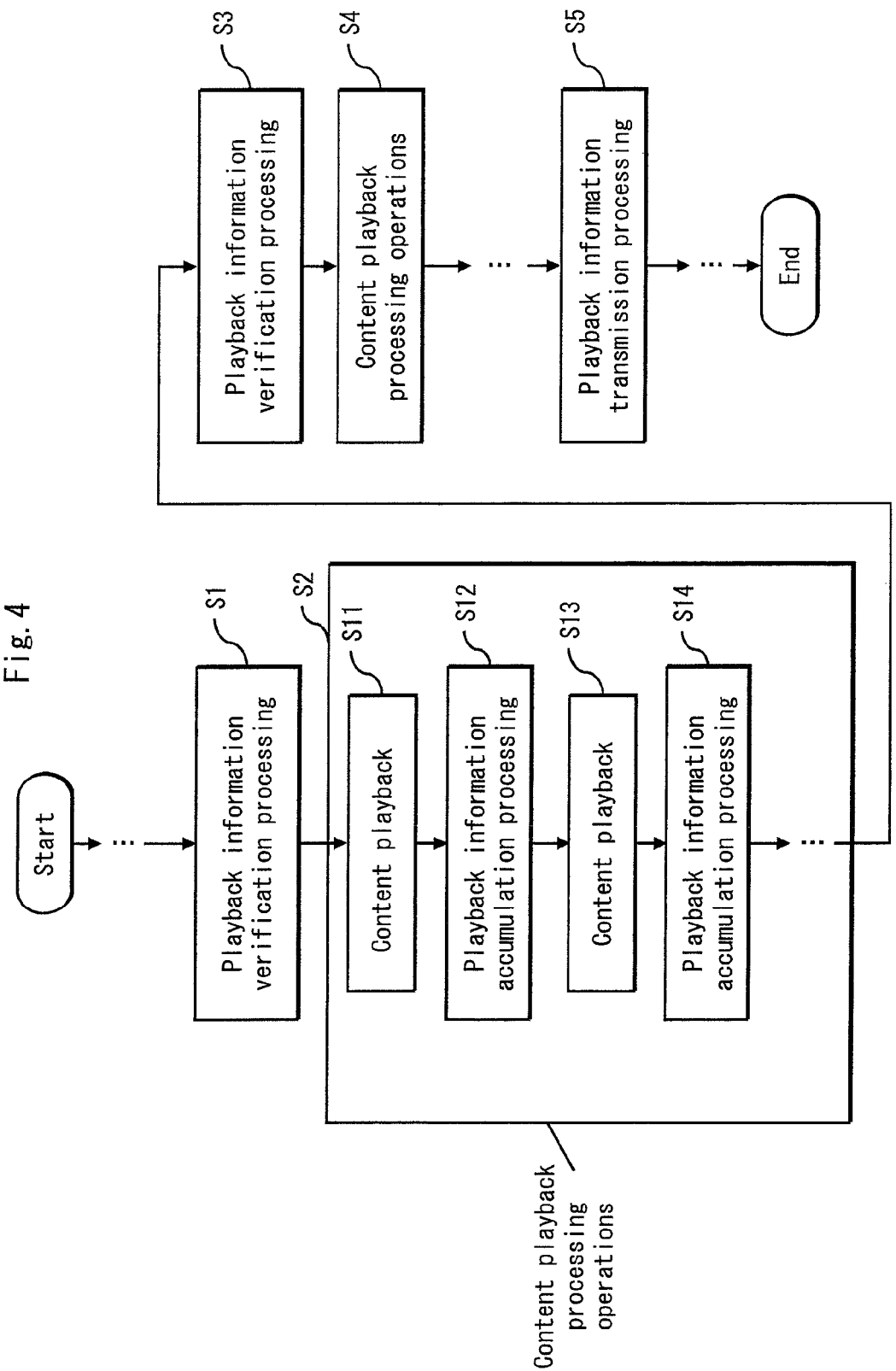
FIG. 4 is a flowchart showing operations performed by of the content playback apparatus 1000.

FIG. 4 shows an overall flow of processing performed by the content playback apparatus 1000.

When a content identifier ID of content to be played is input to the content playback apparatus 1000 from an external device, prior to the content playback processing, the content playback apparatus 1000 performs verification processing of the playback history information corresponding to the content identifier ID (step S1), and thereafter, performs content playback processing operations (step S2). The content playback apparatus 1000 performs playback information transmission processing (step S5) after repeating playback history information verification processing (step S3) and content playback processing operations (step S4).

Here, in the content playback processing operations of step S2, a series of operations for content playback and playback information accumulation processing such as content playback (step S11), playback information accumulation processing (step S12), content playback (step S13), playback information accumulation processing (step S14), . . . are repeatedly performed. The content playback processing operations of step S4 are similar.

(2) Playback Information Verification Processing

Figure 5:
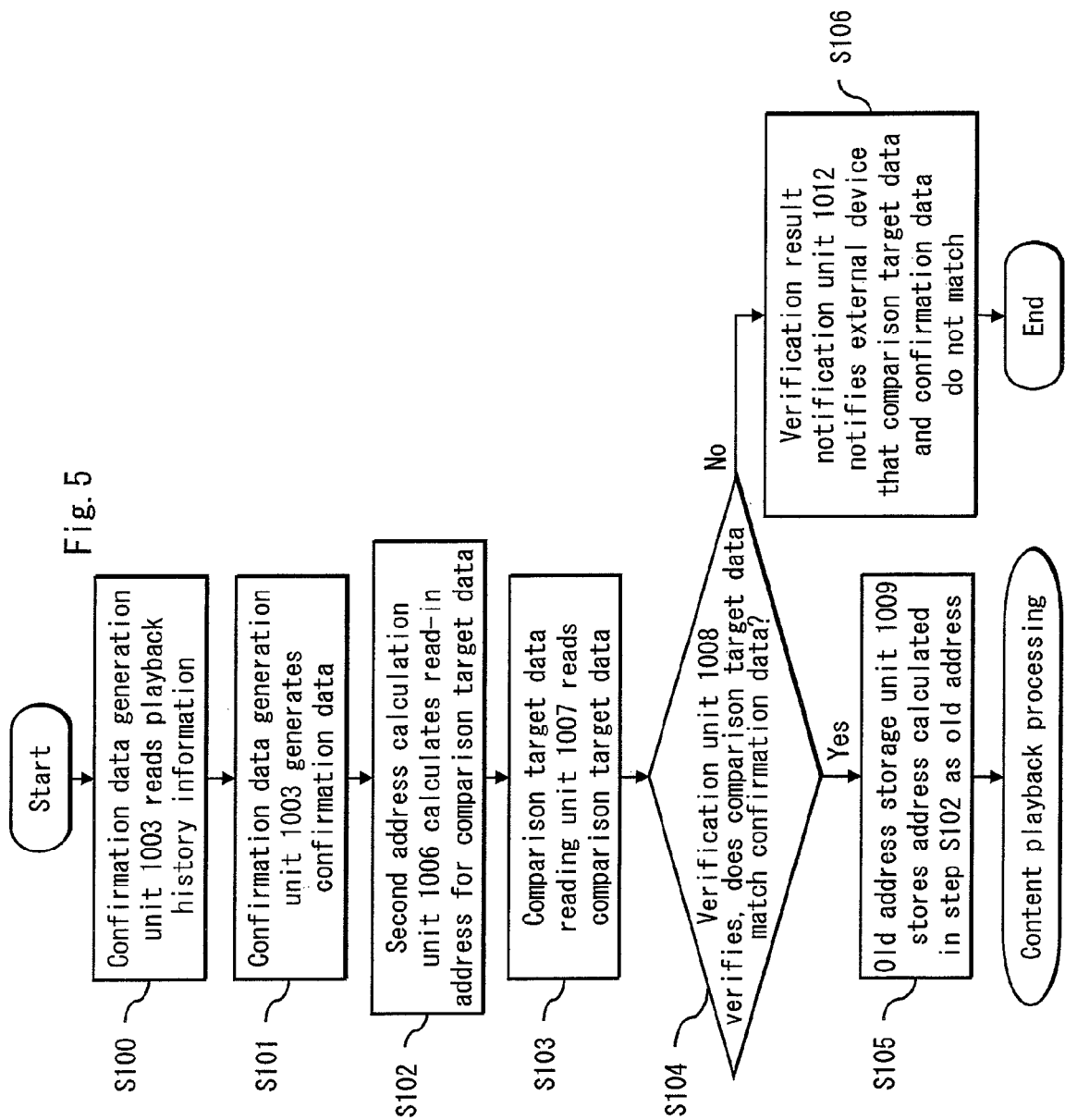
FIG. 5 is a flowchart showing operations of playback information verification processing performed by the content playback apparatus 1000.

FIG. 5 is a flowchart showing operation of playback information verification processing performed by the content playback apparatus 1000. Note that the details of steps S1 and S3 of FIG. 4 are described in the following operations.

The confirmation data generation unit 1003 reads, from the playback information memory 2003, playback history information corresponding to the content identifier input from the external device (step S100).

The confirmation data generation unit 1003 inputs the read playback history information as hash target data to the hash function, and generates a confirmation data piece that is a hash value (step S101).

Next, the second address calculation unit 1006 calculates a read-in address for the comparison target data piece (step S102). Specifically, the second address calculation unit 1006 sets the lower 8 bits of the confirmation data piece generated in step S101 as the read-in address for the comparison target data piece.

The comparison target data reading unit 1007 reads, from the confirmation data memory 2004, a comparison target data piece in the location indicated by the read-in address calculated in step S102 (step S103).

The verification unit 1008 verifies whether the comparison target data piece matches the confirmation data piece (step S104). If the comparison target data piece matches the confirmation data piece (YES in step S104), processing proceeds to step S105, and if the comparison target data piece does not match (NO in step S104), processing proceeds to step S106.

If the judgment in step S104 is YES, the old address storage unit 1009 stores the address calculated in step S102 as the old address (step S105). Thereafter, the content playback apparatus 1000 ends the playback information verification processing, and proceeds to content playback processing.

If the judgment in step S104 is NO, the verification result notification unit 1012 notifies the external device that the comparison target data piece does not match the confirmation data piece (step S106) Thereafter, the content playback apparatus 1000 ends the processing.

(3) Content Playback Processing

Figure 6:
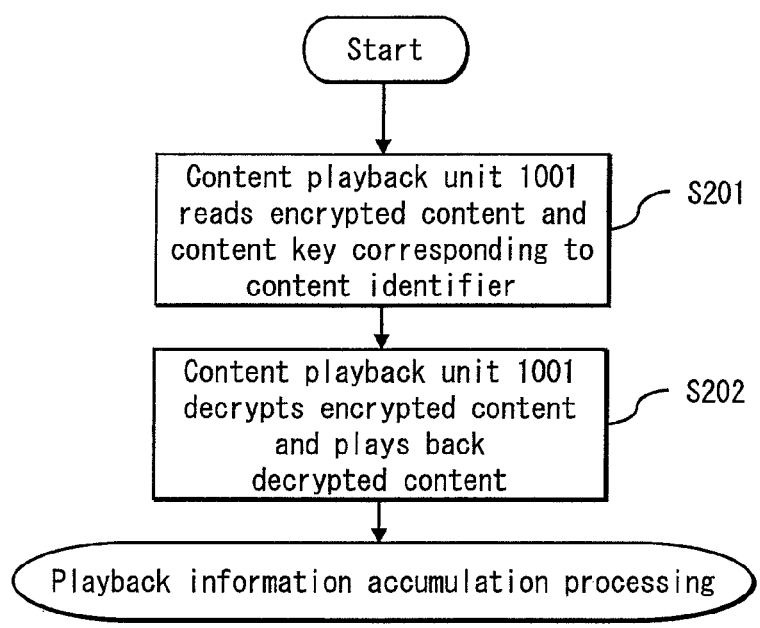
FIG. 6 is a flowchart showing operations of content playback processing performed by the content playback apparatus 1000.

FIG. 6 is a flowchart showing operations of content playback processing performed by the content playback apparatus 1000. Note that the operations shown here are the details of steps S11 and S14 of FIG. 4.

The content playback unit 1001 reads, from the content memory 2001, encrypted content corresponding to the content identifier input from the external device, and further reads a corresponding content key from the content key memory 2002 (step S201).

Next, the content playback unit 1001 decrypts the encrypted content with use of the content key, thus generating the content. The content playback unit plays back the generated content (step S202). Thereafter, the content playback apparatus 1000 performs playback information accumulation processing.

(4) Playback Information Accumulation Processing

Figure 7:
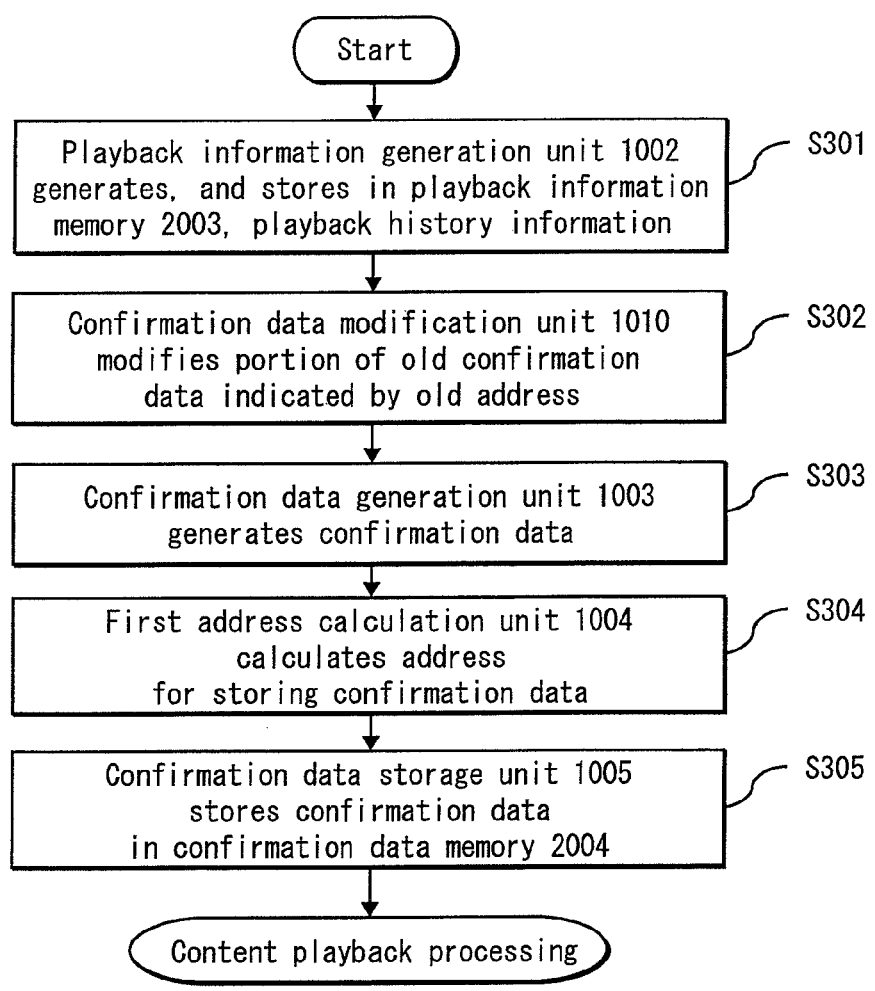
FIG. 7 is a flowchart showing operations of playback information accumulation processing performed by the content playback apparatus 1000.

FIG. 7 is a flowchart showing operations of playback information accumulation processing performed by the content playback apparatus 1000. Note that the operations shown here are details of step S12 and step S14 of FIG. 4.

The playback information generation unit 1002 generates playback history information, and stores the generated playback history information in the playback information memory 2003 (step S301).

Thereafter, the confirmation data modification unit 1010 reads the old address stored in the old address storage unit 1009. The confirmation data modification unit 1010 modifies a portion of the confirmation data piece in the location indicated by the old address (step S302).

Next, the confirmation data generation unit 1003 inputs the stored playback history information generated in step S301 as hash target data to the hash function, and generates a confirmation data piece that is a hash value (step S303).

Thereafter, the first address calculation unit 1004 calculates a storage destination address for the confirmation data piece (step S304) Specifically, the first address calculation unit 1004 sets the lower 8 bits of the confirmation data piece generated in step S303 as the storage destination address.

The confirmation data storage unit 1005 stores the confirmation data piece in the location indicated by the storage destination address in the confirmation data memory 2004 (step S305). Thereafter, the content playback apparatus 1000 performs content playback processing.

Note that the content playback and playback information accumulation processing need not be performed precisely in the order shown in the flowchart of FIG. 4. While playing back the content, the content playback apparatus 1000 performs playback information accumulation processing at a predetermined timing (for example, once a minute).

Here, two specific examples of modification processing performed on the confirmation data piece by the confirmation data modification unit 1010 in step S302 are described with reference to FIGS. 9A and 9B.

FIG. 9A shows an example of modifying old confirmation data by writing 0x00 (inserting zeros in the upper byte) in an upper byte of the old confirmation data of the confirmation data memory 2004. When the old confirmation data is "0x153e48ab . . . ", the old confirmation data is "0x003e48ab . . . " after the modification.

FIG. 9B is an example of modifying old confirmation data by performing an XOR (EXCLUSIVE-OR) operation of an arbitrary value (here, 0xff is used) on the upper byte of the old confirmation data of the confirmation data memory 2004. If the old confirmation data is "0x153e48ab . . . ", after the modification, it becomes "0xea3e48ab . . . ".

The confirmation data modification unit 1010 may use either of the specific examples (a) and (b).

However, in the specific example (a), if the upper byte of the old confirmation data before the modification is "0x00", since the value is not modified, it is preferable for the confirmation data modification unit 1010 to use the XOR operation of (b) in consideration of safety.

(5) Playback Information Transmission Processing

Figure 8:
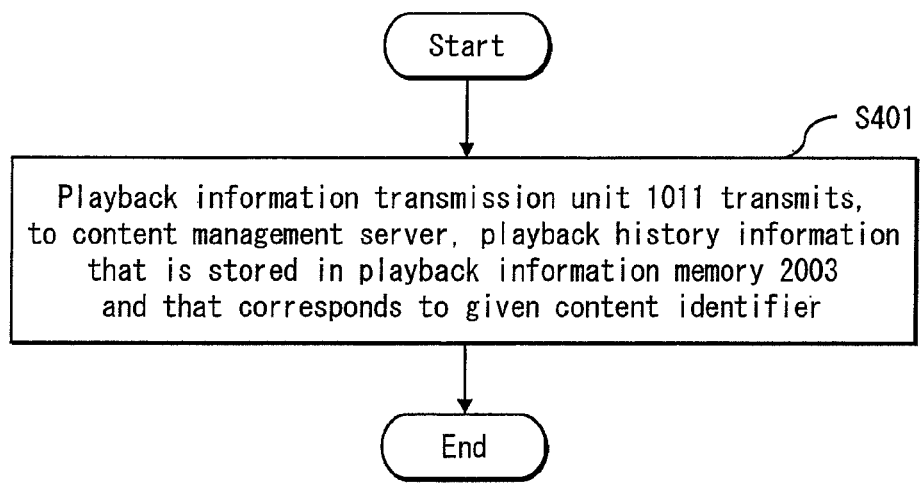
FIG. 8 is a flowchart showing operations of playback information transmission processing performed by the content playback apparatus 1000.

FIG. 8 is a flowchart showing operation of the playback information transmission processing performed by the content playback apparatus 1000. Note that the operations shown here are the details of step S5 in FIG. 4.

Upon receiving a request from the content management server, the playback information transmission unit 1011 reads playback history information corresponding to the requested content identifier from the playback information memory 2003. The playback information transmission unit 1011 transmits the read playback history information to the content management server (step S401). Thereafter, the content playback apparatus 1000 ends the playback information transmission processing.

Note that the content playback apparatus 1000 may perform the above-described playback information transmission processing at a predetermined timing, not necessarily at the time of receiving the request from the content management server.

Effects of the Embodiment

As described above, in the present embodiment, determining the storage destination address according to the confirmation data that is to be stored enables easily generating the storage destination address.

Here, the technology recited in cited document 1 requires performing reading processing twice when reading data, once for reading a pointer and once for reading the data. In contrast, in the present embodiment, performing reading processing of the data only once is sufficient. When writing data, the technology recited in cited document 1 requires reading twice, writing twice, and judging a number of times, but in contrast, in the present embodiment, performing writing processing twice is sufficient.

Furthermore, in the present embodiment, since hash values of the playback history information (confirmation data) are the storage target data, the values of the storage destination address are diffused throughout the playback history information. When a hash function is used for which output corresponding to the input is evenly distributed, the use frequency (number of times that data is written) for each area in the confirmation data memory 2004 can be averaged. In view of this, making the areas in which the confirmation data can be stored larger enables reducing the use frequency of each area in the confirmation data memory 2004, and suppressing the deterioration of the confirmation data memory 2004.

Also, although in the present embodiment, the content playback apparatus 1000 updates the playback history information while playing back the content, when the playback history information is updated, the old (pre-update) confirmation data is modified. This is to prevent a save-restore attack.

Figure 10:
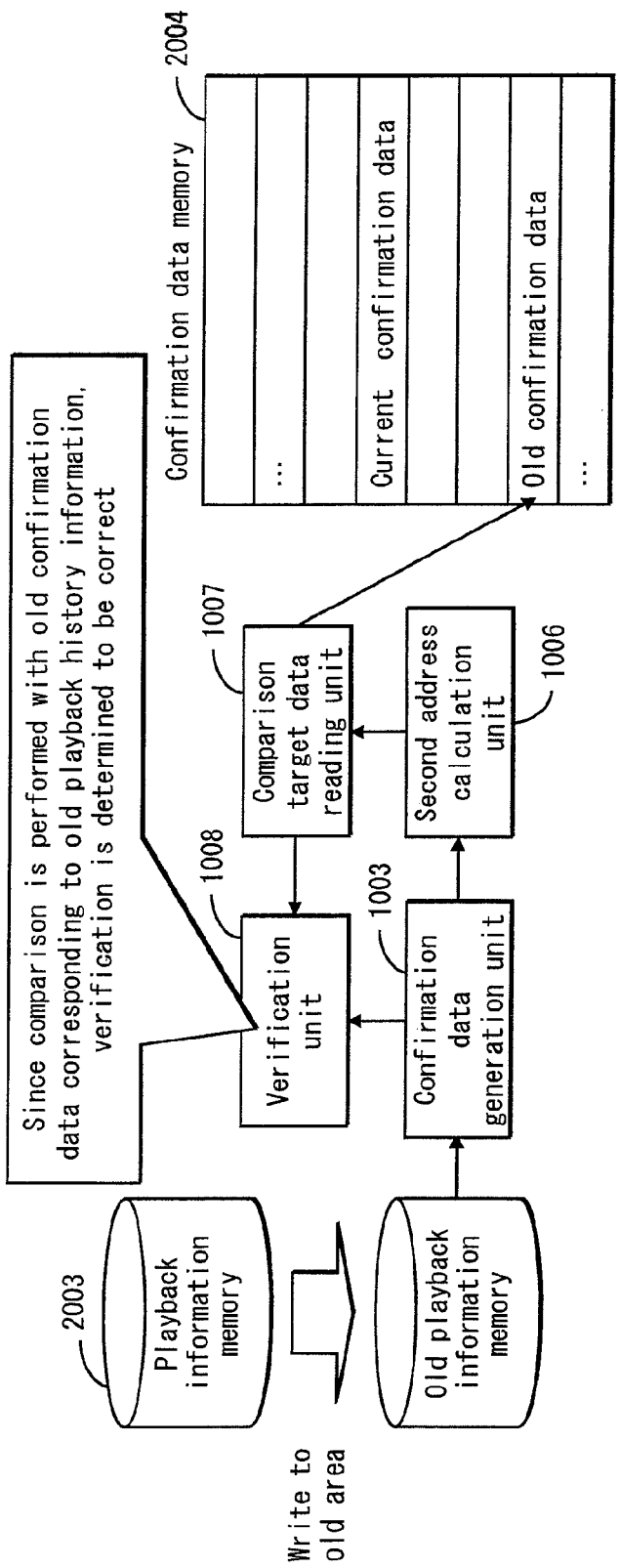
FIG. 10 illustrates an effect of a save-restore attack on the content playback apparatus 1000.

FIG. 10 illustrates a problem that occurs when old confirmation data is not modified. As shown in FIG. 10, when old confirmation data is not modified, if data stored in the playback information memory 2003 is replaced with data stored in an old playback information memory, when playback information verification processing is performed (see FIG. 5), the confirmation data generation unit 1003 generates a hash value of an old playback history information piece as a confirmation data piece.

Thereafter, the second address calculation unit 1006 determines a read-in address for the comparison target data piece according to the generated confirmation data piece, but the old confirmation data piece is stored at the read-in address determined according to the confirmation data piece generated based on the old playback history information.

For this reason, a save restore attack is possible when data stored in the playback information memory 2003 is replaced with data of the old playback information memory, since the verification is determined to be correct in the verification processing performed by the verification unit 1008.

In view of this, in the present embodiment, since the old confirmation data is modified when the playback history information is updated, even if the data stored in the playback information memory 2003 is replaced with the data of the old playback information memory, since the confirmation data and the comparison target data piece do not match, an irregularity can be detected when the verification processing is performed by the verification unit 1008.

Furthermore, in the present embodiment, since only a portion of the old confirmation data is modified rather than the entirety, it is possible to reduce the size of the area accessed when writing the modified data. The reason that only a "portion" of the old confirmation data needs to be modified is as follows. The content playback apparatus 1000 uses a hash function to calculate the confirmation data when performing playback information verification processing. Even if the hash target data (old playback history information) corresponding to the pre-modification confirmation data is known, obtaining hash target data corresponding to confirmation data of which at least one bit has been modified is difficult.

Here, assume that a flash memory is used as the confirmation data memory 2004. Normally, a block unit is used as a minimum writing unit for accessing a flash memory.

When the size of the confirmation data piece is larger than the size of one block, since modifying one arbitrary block in the confirmation data (the portion of the confirmation data) is sufficient, the blocks to be modified can be reduced, and deterioration of the flash memory can be suppressed.

Also, when the confirmation data piece is stored so as to be included in two blocks, since it is sufficient to modify a portion of the confirmation data stored in either one of the blocks, the blocks to be modified can be reduced, and deterioration of the flash memory can be suppressed.

Note that since it is sufficient to modify at least one bit of the old confirmation data, modification may be performed on an arbitrary one bit, one byte, or one block of the old confirmation data, or on the entirety of the old confirmation data. Also, modification may be performed on one bit, one byte, or one block randomly selected from the old confirmation data.

Figure 11:
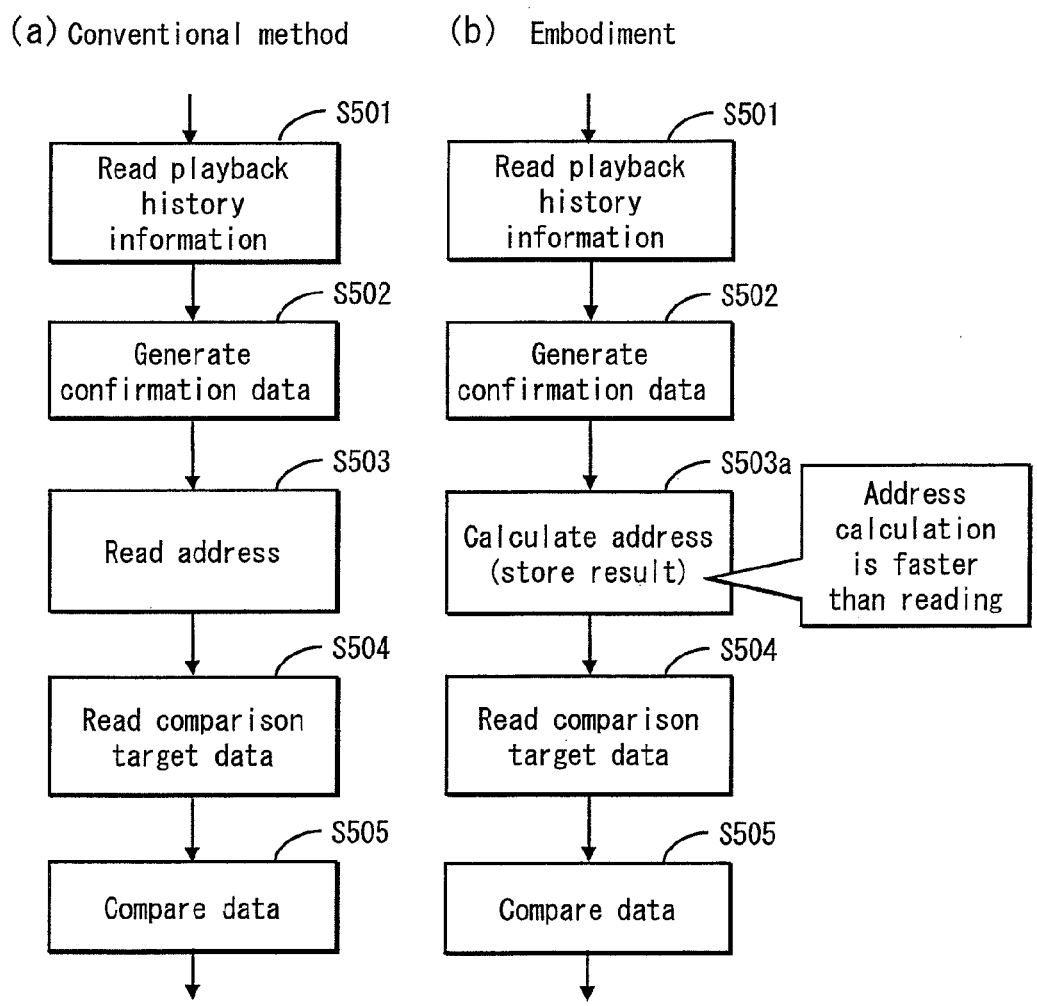
FIGS. 11(a) and (b) illustrates a comparison between playback verification processing using a conventional method, and playback verification processing performed by the content playback apparatus 1000.

Next, the conventional method and the above embodiment are compared with respect to playback information authorization processing, with reference to FIGS. 11(*a*) and (*b*).

FIG. 11(*a*) shows conventional playback information verification processing.

In conventional playback information verification processing, the playback history information is read (step S501), and verification data is generated from the playback history information (step S502). An address indicating a storage destination for the comparison target data piece is read (step S503), and the comparison target data piece is read from the address (step S504). Thereafter, the confirmation data piece and the comparison target data piece are compared (step S505).

FIG. 11(*b*) shows playback information verification processing performed in the above-described embodiment of the present invention.

In the playback information verification processing of the embodiment, the playback history information is read (step S501), and confirmation data is generated from the playback history information (step S502). An address indicating a storage destination for the comparison target data piece is calculated (step S503*a*), and the comparison target data piece is read from the address (step S504). Thereafter, the confirmation data piece and the comparison target data piece are compared (step S505).

When the two are compared, step S503 and step S503*a* are different. That is to say, in the embodiment of the present invention, instead of reading the address as in the conventional technology, the address is calculated. This address calculation is a modulo calculation of the confirmation data, and is performed by extracting the lower predetermined bit(s) of the confirmation data. For this reason, the address calculation of step S503*a* is faster than the address reading in step S503.

Accordingly, when comparing the playback verification processing overall, the embodiment of the present invention enables faster processing than the conventional method.

Figure 12:
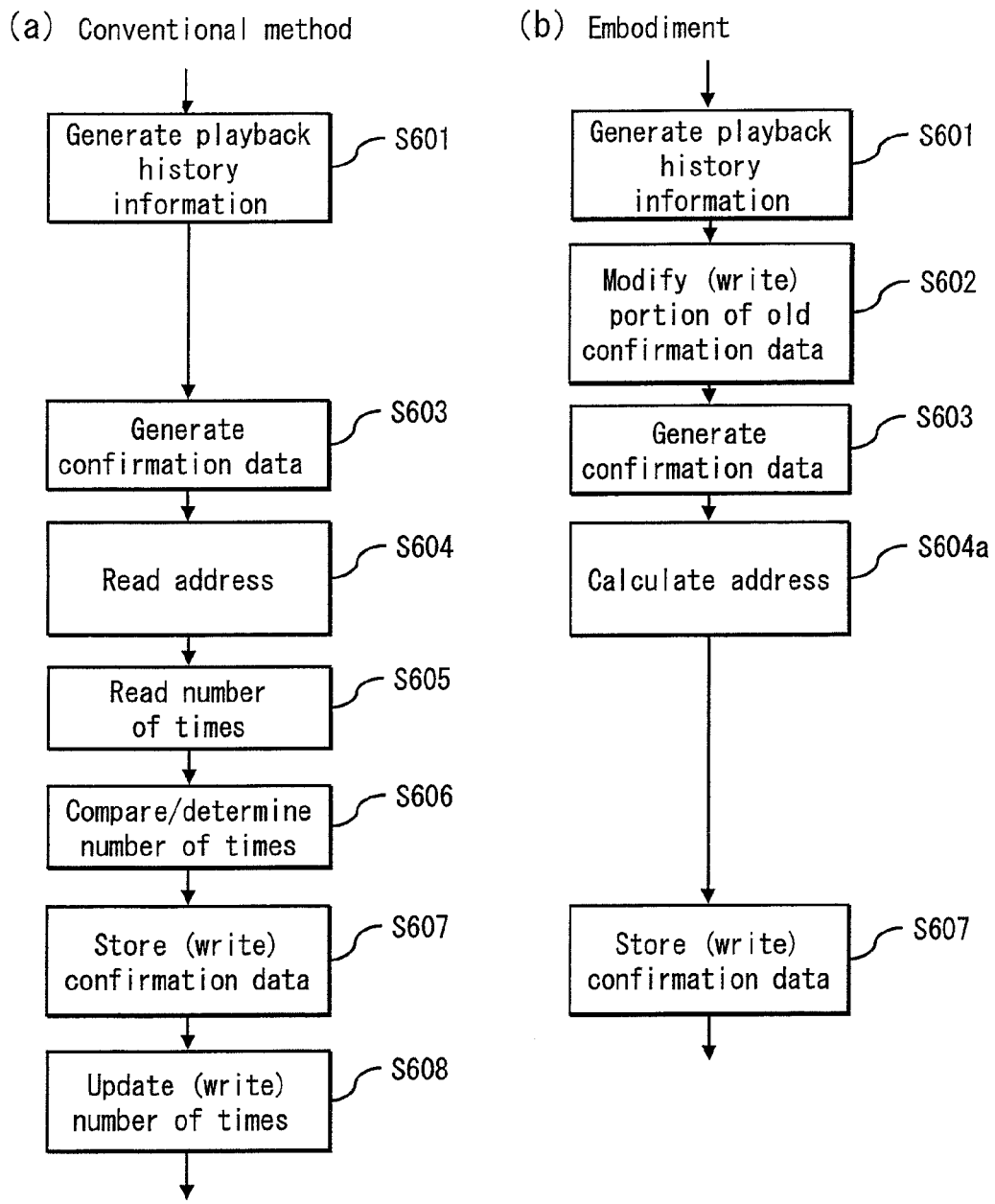
FIGS. 12(a) and (b) illustrates a comparison between playback information accumulation processing using a conventional method, and playback information accumulation processing performed by the content playback apparatus 1000, and FIGS. 13(*a*) and (*b*) shows a conventional technology that is a measure against deterioration of a flash memory.
Figure 13:
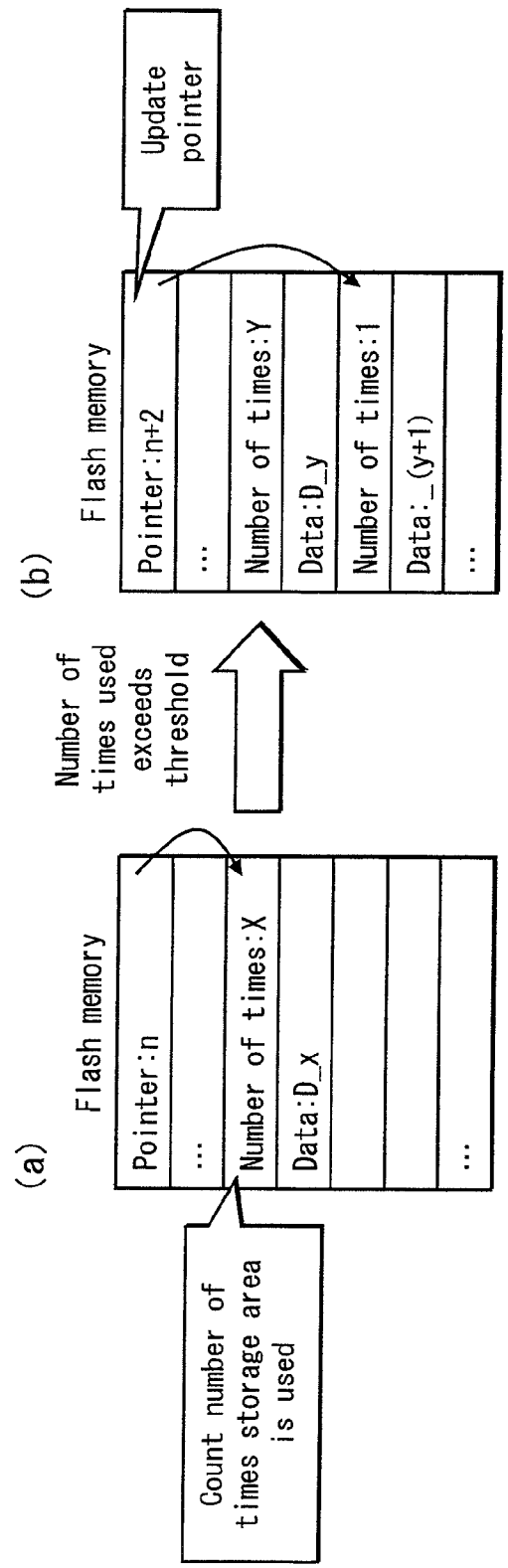

Next, with reference to FIGS. 12(*a*) and (*b*), the conventional method and the above-described embodiment are compared with respect to playback information accumulation processing.

FIG. 12(*a*) shows conventional playback information accumulation processing.

In conventional playback information accumulation processing, first, playback history information is generated (step S601), and thereafter, confirmation data is generated from the playback history information (step S603). Next, an address indicating a storage destination of the confirmation data is read (step S604). Thereafter, the number of times written is read (step S605), the number of times written is compared to a threshold, and a judgment is made as to whether the number of times written is less than or equal to the threshold (step S606). If the number of times written is less than or equal to the threshold, the confirmation data is stored in a location indicated by the address read in step S604 (step S607). Lastly, the number of times written is updated (step S608).

FIG. 12(*b*) shows playback information accumulation processing in the above-described embodiment of the present invention.

In the playback information accumulation processing of the embodiment, first, the playback history information is generated (step S601), and thereafter, a portion of the old confirmation data is modified (step S602). Next, confirmation data is generated from the playback history information (step S603), and an address is calculated from the generated confirmation data (step S604*a*). The confirmation data is stored in a location indicated by the address calculated in step S604 (step S607).

When the two are compared, in contrast to the conventional method which includes seven steps, the embodiment includes five steps which is fewer than the conventional method.

Also, in step S604*a* of the embodiment of the present invention, instead of reading the address as in the conventional technology, the address is calculated. This address calculation is a modulo calculation of the confirmation data, and is performed by extracting the lower predetermined bit(s) of the confirmation data. For this reason, the address calculation of step S604*a* is faster than the address reading in step S604.

Accordingly, when comparing the two types of playback information accumulation processing as a whole, the embodiment of the present invention enables faster processing than the conventional method.

Other Variations

The embodiment described above is one exemplary embodiment of the present invention, but the present invention is not limited to this embodiment, and may be realized in any of many different configurations within a scope that does not deviate from the idea of the invention. For example, the following cases are also included in the present invention.

(1) In the above embodiment, the content playback apparatus 1000 transmits playback history information to the content management server, and the content playback apparatus 1000 may perform playback information verification processing before transmitting the playback history information, and transmit the playback history information to the content management server after confirming the authenticity of the playback information to be transmitted.

(2) Although the content playback apparatus 1000 uses a playback time or a number of times played back as the playback history information, the present invention is not limited to this. For example, a number of times that a predetermined part of the content has been played back may be used. Also, a number of times that a particular playback operation such as fast-forward or rewind has been performed may be used. Furthermore, a combination of a playback time and a number of times of any of these may be used.

(3) In the above embodiment, the content playback apparatus 1000 updates (accumulates) the playback history information of the content, and verifies the authenticity of the playback history information. However, the present invention is not limited to this, and instead, playback right information may be updated (accumulated) and verified.

In a case of accumulating playback right information, the content playback apparatus 1000 may be configured to obtain the playback right information in advance when obtaining a content and a content key from the content management server.

Here, the playback right information is, for example, a time limit until which the content can be played back (example: until Mar. 25, 2008), a remaining playback time in which the content can be played back, a remaining number of times the content can be played back, a remaining number of times a predetermined part of the content can be played back, or a remaining number of times a particular playback operation can be performed. Furthermore, the playback right information may be a combination of any of these.

Also, the content playback apparatus 1000 may update and verify a piece of playback information that is a combination of the playback history information and the playback right information.

(4) Although in the above embodiment, for each content identifier, an area is provided in the confirmation data memory 2004 in which the confirmation data corresponding to the content identifier can be stored, the present invention is not limited to this, and a single area in which confirmation data can be stored may be held in common between a plurality of content identifiers.

(5) Although according to the above embodiment, the confirmation data memory 2004 is 2^8 times larger in size than the confirmation data, the present invention is not limited to this. The size of the areas in which the confirmation data can be stored may be any number of times larger than the confirmation data. For example, the size may be n times (n: an integer greater than or equal to 2).

In this case, the first address calculation unit 1004 and the second address calculation unit 1006 calculate, as the storage destination address and the read-in address, values obtained by performing the operation "mod n" on the confirmation data.

Also, even when the size of the area in which the confirmation data can be stored is set as n times the size of the confirmation data, the first address calculation unit 1004 and the second address calculation unit 1006 may calculate values obtained by performing "mod m (m≠n)" as the storage destination address and the read-in address.

Furthermore, the areas in which the confirmation data can be stored need not be an integral multiple of the size of the confirmation data. For example, the size of the areas in which the confirmation data can be stored may be 1000.5 times the size of the confirmation data.

(6) In the above-described embodiment, when the comparison target data piece matches the confirmation data piece, the old address storage unit 1009 stores the address calculated by the second address calculation unit 1006 as the old address for the confirmation data piece. However, the stored address and the timing of storing the address are not limited to this.

For example, the confirmation data storage unit 1005 may store, as the old address, a storage destination address calculated by the first address calculation unit 1004 when the confirmation data was stored in the confirmation data storage unit 1005. Also, the old address may be stored at any time.

(7) In the above example, in the old address storage unit 1009, upon storing the address of the old confirmation data, the confirmation data modification unit 1010 modifies the confirmation data stored at the old address, but the present invention is not limited to this.

The old address storage unit 1009 may store the old confirmation data itself, and the confirmation data modification unit 1010 may calculate the address according to the old confirmation data, and modify the confirmation data stored at the address. A method similar to that used by the first address calculation unit 1004 and the second address calculation unit 1006 may be used as the address calculation method.

(8) As described above, the content may be one or more of music, a movie, a photograph, animation, a computer game, a computer program, etc. Although in the above embodiment, the content playback apparatus 1000 "plays back" the content, when the content is a program, the content playback apparatus 1000 may be configured to "execute" the program.

(9) In the above-described embodiment, the content playback apparatus 1000 is described as an embodiment of the present invention. However, the present invention is not limited to this, and can also be realized by an embodiment of a data storage apparatus that does not include a content playback function.

The data storage apparatus, for example, maybe a mobile terminal. Instead of performing update (accumulation) and verification of the playback history information, the data storage apparatus may perform update (accumulation) and verification of a movement history, that is to say, a location history.

When the data storage apparatus updates/verifies the location history, the playback history generation unit 1002 in the above embodiment is modified to be the location history information generation unit 1002' that generates location history information, and the playback history information in the present embodiment is modified to be location history information.

The location history information generation unit 1002' includes a means for detecting information, and updates the location history information at a predetermined timing (for example, each time a predetermined period has passed), or each time a location history is modified.

(10) Also, instead of a location history, a history of a predetermined type of processing, for example, an access history indicating access to a server or computer, a history of random number generation processing, a history of processing for issuing keys and certificates, etc. can be managed, and a data storage apparatus that updates and verifies these is also included in the present invention.

In this case, the data storage apparatus does not include a content playback function as included in the content playback apparatus 1000, and may simply include a function of accumulating history data for the above-mentioned processing. Also, in a case of accumulating a history of random number generation processing, the data storage apparatus may accumulate, as the history information, the random numbers themselves, or seed information for generating the random numbers. Also, in the case of processing for issuing keys and certificates, the data storage apparatus may accumulate, as history information, keys such as private keys and public keys, or a signature portion of the certificate.

(11) In the above embodiment, the content playback apparatus 1000 stores the playback history information targeted for verification in the playback information memory 2003. However, the present invention is not limited to this, and the content playback apparatus 1000 may be configured to acquire the playback history information from an external device.

Also, the present invention may be a data verification apparatus that receives an input of data targeted for verification from an external device, and verifies the data. In this case, password data may be used as the data targeted for verification instead of playback history information.

When password data is used as the data targeted for verification, the password data may be modified frequently. The data verification apparatus may be configured to modify a portion or the entirety of the old confirmation data corresponding to the old password data.

(12) The content playback apparatus 1000 of the above-described embodiment may include a means for acquiring location information. The content playback apparatus 1000 may provide a mechanism whereby playback is possible only in a specified location.

Also, the content playback apparatus 1000 may be structured to modify the specified portion of the content in which playback is possible at an arbitrary timing.

Also, in place of content playback processing, the present invention may be an apparatus that performs another specified type of processing, and may be an apparatus that provides a mechanism by which the specified processing can only be executed on the specified portion.

(13) The above-described apparatuses may be computer systems structured specifically from a microprocessor, a ROM, a RAM, a hard disk unit, a display unit, a keyboard, a mouse, etc. A computer program is stored in the RAM or the hard disk unit. The apparatuses achieve their functions as the microprocessor operates in accordance with the computer program. Here, instruction code which indicates commands to the computer is structured as a combination of multiple instruction codes in order for the computer program to achieve predetermined functions.

(14) A portion or all of the constituent elements of the apparatuses of the above embodiments and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

(15) A portion or all of the constituent elements of the apparatuses of the above embodiments and variations may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

(16) The present invention may be the methods shown above. Also, the present invention may be computer programs for causing computers to realize the methods, or may be digital signals representing the computer programs.

(17) Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

(18) Also, the present invention may be the computer programs or digital signals which are transmitted via an electronic communications circuit, a wireless or fixed-line communications circuit, a network such as the Internet, a data broadcast, etc.

(19) Also, the present invention may be a computer system including a microprocessor and a memory, whereby the memory stores the computer programs, and the microprocessor operates in accordance with the computer programs.

(20) Also, the present invention may be carried out by another independent computer system by transferring the programs or the digital signals which have been recorded on the recording media, or by transferring the programs or the digital signals via the network, etc.

(21) The present invention may be any combination of the above embodiments and variations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A content playback apparatus comprising:
a playback unit operable to play back content;
a non-secure storage unit that is not protected by tamper resistant technology and stores a playback information piece related to playback of the content;
a secure storage unit that is protected by tamper resistant technology and has a property of deteriorating when data is repeatedly written thereon;
a generation unit operable to generate a first integrity check data piece, that is data for verifying the playback information piece, by performing a predetermined calculation on the playback information piece stored in the non-secure storage unit;
a storage processing unit operable to generate, according to a first number sequence in a predetermined portion of the first integrity check data piece, a first address at which to store the first integrity check data piece in the secure storage unit, and to store the first integrity check data piece at the generated first address in the secure storage unit;
a verification unit operable to (i) calculate a second integrity check data piece by reading a playback information piece pertaining to content targeted for playback from the non-secure storage unit and performing the predetermined calculation on the read playback information piece, (ii) read an integrity check data piece from a second address in the secure storage unit, the second address having been generated according to a second number sequence in a predetermined portion of the second integrity check data piece, (iii) compare the read integrity check data piece to the first integrity check data piece, (iv) judge, if a result of the comparison is a match, that the playback information piece has not been falsified, and (v) judge, if the result of the comparison is not a match, that the playback information piece has been falsified; and
a playback information generation unit operable to update the playback information piece when the content is played back by the playback unit, thereby generating an updated playback information piece, and to store the updated playback information piece in the non-secure storage unit,
wherein the playback unit plays back the content if the verification unit judges that the playback information piece has not been falsified,
wherein the generation unit generates a third integrity check data piece by performing the predetermined calculation on the updated playback information piece,
wherein the storage processing unit rewrites a portion of the first integrity check data piece stored at the first address of the secure storage unit, thereby generating a partially rewritten first integrity check data piece, and wherein the storage processing unit is further operable to generate, according to a third number sequence in the predetermined portion of the third integrity check data piece, a third address at which to store the third integrity check data piece in the secure storage unit, and to store the third integrity check data piece at the generated third address in the secure storage unit.

2. The content playback apparatus of claim 1, wherein if the verification unit judges that the playback information piece has been falsified, the playback unit prohibits playback of the content.

3. The content playback apparatus of claim 1, wherein if the verification unit judges that the playback information piece has not been falsified, the playback unit plays back the content.

4. The content playback apparatus of claim 1, wherein the verification unit, if the read integrity check data piece is the partially rewritten first integrity check data piece, compares the predetermined integrity check data piece to the first integrity check data piece and judges that there is not a match.

5. The content playback apparatus of claim 1 further comprising:

an old address storage unit that stores a first address of the partially rewritten first integrity check data piece, wherein the verification unit reads, according to the first address read from the old address storage unit, the partially rewritten first integrity check data piece from the secure storage unit, as the integrity check data piece, and wherein the verification unit compares the partially rewritten first integrity check data piece to the first integrity check data piece and judges that there is not a match.

6. A content playback method for use in a content playback apparatus including:

a playback unit operable to play back content;

a non-secure storage unit that is not protected by tamper resistant technology and stores a playback information piece related to playback of the content; and a secure storage unit that is protected by tamper resistant technology and has a property of deteriorating when data is repeatedly written thereon, the content playback method comprising:

generating a first integrity check data piece, that is data for verifying the playback information piece, by performing a predetermined calculation on the playback information piece stored in the non-secure storage unit;

generating, according to a first number sequence in a predetermined portion of the first integrity check data piece, a first address at which to store the first integrity check data piece in the secure storage unit, and storing the first integrity check data piece at the generated first address in the secure storage unit;

judging whether or not the playback information piece has been falsified by (i) calculating a second integrity check data piece by reading a playback information piece pertaining to content targeted for playback from the non-secure storage unit and performing the predetermined calculation on the read playback information piece, (ii) reading an integrity check data piece from a second address in the secure storage unit, the second address having been generated according to a second number sequence in a predetermined portion of the second integrity check data piece, (iii) comparing the read integrity check data piece to the first integrity check data piece, (iv) judging, if a result of the comparison is a match, that the playback information piece has not been falsified, and (v) judging, if the result of the comparison is not a match, that the playback information piece has been falsified; and generating an updated playback information piece by updating the playback information piece when the content is played back by the playback unit, and storing the updated playback information piece in the non-secure storage unit, wherein the playback unit plays back the content if the judging whether or not the playback information piece has been falsified judges that the playback information piece has not been falsified, and wherein the content playback method further comprises:

generating a third integrity check data piece by performing the predetermined calculation on the updated playback information piece;

generating a partially rewritten first integrity check data piece by rewriting a portion of the first integrity check data piece stored at the first address of the secure storage unit; and generating, according to a third number sequence in the predetermined portion of the third integrity check data piece, a third address at which to store the third integrity check data piece in the secure storage unit, and storing the third integrity check data piece at the generated third address in the secure storage unit.

7. A non-transitory computer readable recording medium having stored thereon a program, wherein, when executed, the program causes a content playback apparatus to perform a content playback method, the content playback apparatus including:

a playback unit operable to play back content;

a non-secure storage unit that is not protected by tamper resistant technology and stores a playback information piece related to playback of the content; and a secure storage unit that is protected by tamper resistant technology and has a property of deteriorating when data is repeatedly written thereon, the content playback method comprising:

generating a first integrity check data piece, that is data for verifying the playback information piece, by performing a predetermined calculation on the playback information piece stored in the non-secure storage unit;

generating, according to a first number sequence in a predetermined portion of the first integrity check data piece, a first address at which to store the first integrity check data piece in the secure storage unit, and storing the first integrity check data piece at the generated first address in the secure storage unit;

judging whether or not the playback information piece has been falsified by (i) calculating a second integrity check data piece by reading a playback information piece pertaining to content targeted for playback from the non-secure storage unit and performing the predetermined calculation on the read playback information piece, (ii) reading an integrity check data piece from a second address in the secure storage unit, the second address having been generated according to a second number sequence in a predetermined portion of the second integrity check data piece, (iii) comparing the read integrity check data piece to the first integrity check data piece, (iv) judging, if a result of the comparison is a match, that the playback information piece has not been falsified, and (v) judging, if the result of the comparison is not a match, that the playback information piece has been falsified; and generating an updated playback information piece by updating the playback information piece when the content is played back by the playback unit, and storing the updated playback information piece in the non-secure storage unit, wherein the playback unit plays back the content if the judging whether or not the playback information piece has been falsified judges that the playback information piece has not been falsified, and wherein the content playback method further comprises:
generating a third integrity check data piece by performing the predetermined calculation on the updated playback information piece;

generating a partially rewritten first integrity check data piece by rewriting a portion of the first integrity check data piece stored at the first address of the secure storage unit; and generating, according to a third number sequence in the predetermined portion of the third integrity check data piece, a third address at which to store the third integrity check data piece in the secure storage unit, and storing the third integrity check data piece at the generated third address in the secure storage unit.

\* \* \* \* \*